(12) United States Patent
Howson

(10) Patent No.: US 9,409,092 B2
(45) Date of Patent: Aug. 9, 2016

(54) SYSTEMS AND METHODS FOR INTEGRATING MUSICAL FEATURES INTO A GAME

(71) Applicant: Gamesys Ltd., London (GB)

(72) Inventor: Gregory John Howson, Guildford (GB)

(73) Assignee: Gamesys Ltd., London (GB)

( * ) Notice: Subject to any disclaimer, the term of this patent is extended or adjusted under 35 U.S.C. 154(b) by 0 days.

(21) Appl. No.: 14/449,272

(22) Filed: Aug. 1, 2014

(65) Prior Publication Data

US 2015/0038228 A1    Feb. 5, 2015

Related U.S. Application Data

(60) Provisional application No. 61/862,016, filed on Aug. 3, 2013.

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/69 | (2014.01) |
| A63F 13/35 | (2014.01) |
| A63F 13/40 | (2014.01) |
| A63F 13/30 | (2014.01) |

(52) U.S. Cl.
CPC ............... *A63F 13/69* (2014.09); *A63F 13/10* (2013.01); *A63F 13/12* (2013.01); *A63F 13/35* (2014.09); *A63F 2300/609* (2013.01); *A63F 2300/6081* (2013.01); *A63F 2300/8047* (2013.01)

(58) Field of Classification Search
USPC .................... 463/20, 25, 35, 39, 40, 42, 31
See application file for complete search history.

(56) References Cited

U.S. PATENT DOCUMENTS

| | | | |
|---|---|---|---|
| 6,066,792 A | 5/2000 | Sone | |
| 6,756,534 B2 | 6/2004 | Gimpelson | |
| 7,164,076 B2 | 1/2007 | McHale | |
| 7,739,595 B2 | 6/2010 | Salter | |
| 8,134,061 B2 | 3/2012 | Feeney | |
| 8,282,490 B2 | 10/2012 | Arezina | |
| 8,629,342 B2 | 1/2014 | Lee | |
| 8,636,572 B2 | 1/2014 | Applewhite | |
| 2002/0065817 A1* | 5/2002 | Ito et al. ........................... 707/5 |
| 2002/0197993 A1* | 12/2002 | Cho et al. ..................... 455/435 |
| 2005/0235809 A1* | 10/2005 | Kageyama ..................... 84/601 |
| 2009/0005169 A1 | 1/2009 | Pellegrinelli | |
| 2009/0082104 A1 | 3/2009 | Hegstrom | |

(Continued)

FOREIGN PATENT DOCUMENTS

WO    WO-2004019303    3/2004

OTHER PUBLICATIONS

Fish, Jonathan, "Interactive and adaptive audio for home video game consoles", (2003), p. 188.

(Continued)

*Primary Examiner* — Adetokunbo O Torimiro
(74) *Attorney, Agent, or Firm* — Michael D. Downs; Fincham Downs LLC

(57) ABSTRACT

Systems, methods, and articles of manufacture provide for new features and functionality of slot-style games. In some embodiments, one or more music components, music-related game objects and/or other types of musical features may be integrated into a game.

20 Claims, 4 Drawing Sheets

(56) References Cited

U.S. PATENT DOCUMENTS

| | | | |
|---|---|---|---|
| 2010/0009750 A1* | 1/2010 | Egozy | A63F 13/005 463/35 |
| 2011/0207513 A1 | 8/2011 | Cross | |
| 2011/0302240 A1* | 12/2011 | Saito et al. | 709/203 |
| 2012/0194648 A1 | 8/2012 | Hofshi | |
| 2013/0203492 A1* | 8/2013 | Yum | A63F 13/06 463/31 |
| 2014/0087878 A1 | 3/2014 | Basallo | |

OTHER PUBLICATIONS

International Application Serial No. PCT/IB2014/063639, International Search Report mailed Oct. 28, 2014, 3 pgs.

International Application Serial No. PCT/IB2014/063639, Written Opinion mailed Oct. 28, 2014, 5 pgs.

Whalen, Zachary Nathan, "Play Along: video game music as metaphor and metonymy.", (2004), 70 pgs.

* cited by examiner

SYSTEMS AND METHODS FOR INTEGRATING MUSICAL FEATURES INTO A GAME

BACKGROUND

Games, whether wagering or non-wagering, are a popular past-time for millions of people all over the world. Electronic games in particular are becoming more and more popular, particularly ones playable online using a computer connected to a network. For example, according to some reports more than 200 million people play social games every month and online games recently passed e-mail as the second-most popular activity online, second only behind social networking. Accordingly, there is a need to continue to create exciting electronic games which maintain players' interest and stand out from the multitude of available online games.

BRIEF DESCRIPTION OF THE DRAWINGS

An understanding of embodiments described herein and many of the attendant advantages thereof may be readily obtained by reference to the following detailed description when considered with the accompanying drawings, of which.

DETAILED DESCRIPTION

Figure 1:
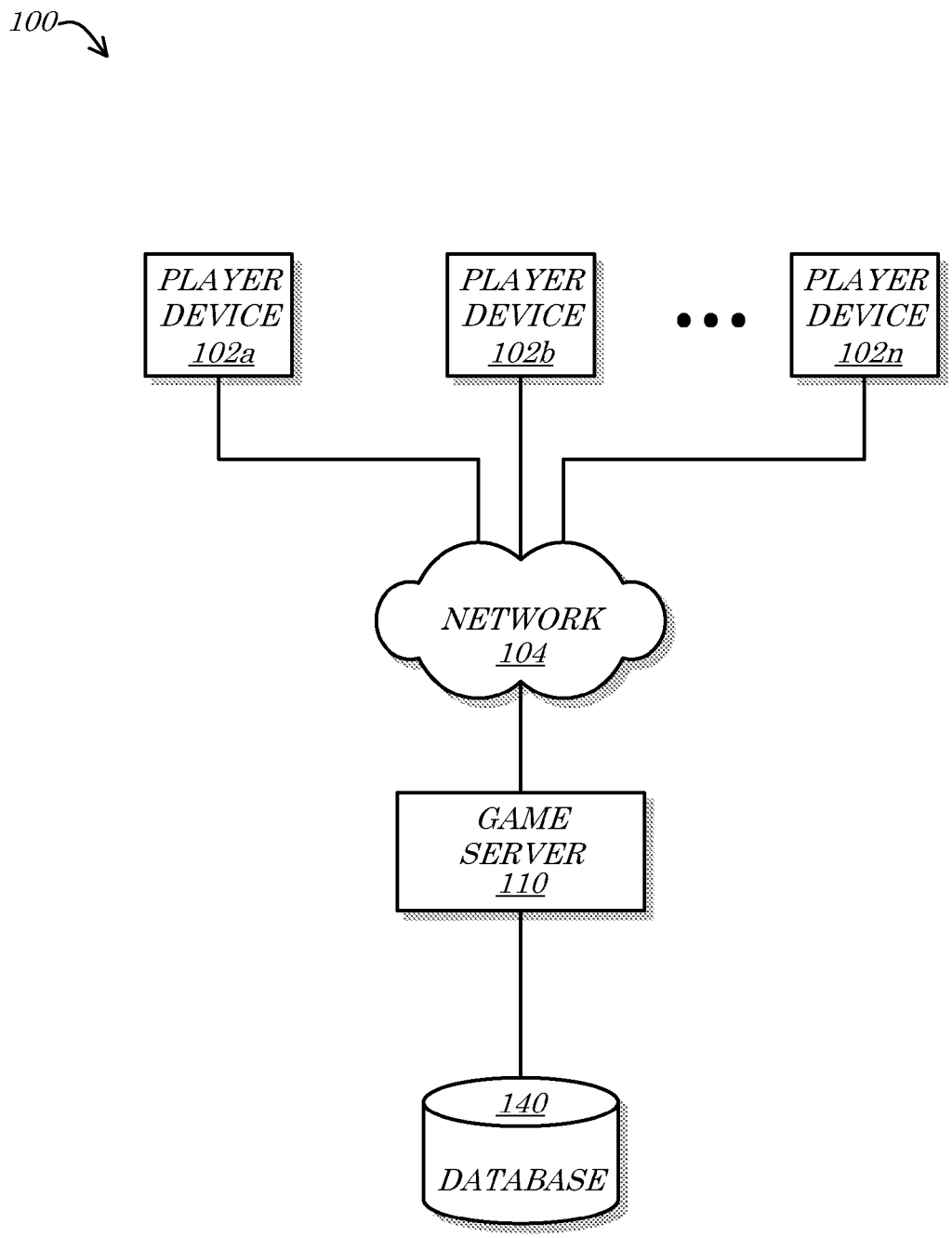
FIG. 1 is a block diagram of a system according to some embodiments.

Embodiments presented herein are descriptive of systems, apparatus, methods, and articles of manufacture for new features and functionality of slot-style and/or reel-type games.

Various "reel-type" or reeled slot machine games, whether deployed on dedicated gaming devices (e.g., a traditional slot machine device in a casino, operable primarily to facilitate one or more slot machine games) or on non-dedicated computing devices (e.g., personal computers, mobile devices, laptops or table computers, which are operable to perform a variety of functions in addition to supporting reeled slot machine games) are popular with many players. A reeled slot machine game typically includes a plurality of reels, each reel including a plurality of symbol positions for display of a reel symbol. A reel symbol is a visual representation of an element or indicia used in the game to determine whether the player qualifies for an award. The reel may be mechanical (e.g., in a physical dedicated gaming device on a casino floor) or virtual (e.g., a software representation of a reel on an electronic display of a dedicated or non-dedicated device). The reels spin (or representations of virtual reels are made to look as if they spin) after a player places a wager on the game or provides another qualifying input. The reels then stop to display generated combinations of symbols on the reels.

The "outcome" of a spin, as the term is used herein, is the set of symbols as displayed in the reel positions. Thus, a symbol may be considered to be a component of an outcome, as it contributes to the outcome by virtue of its presence along a payline. If a generated symbol or combination of symbols is a winning symbol or combination of symbols (i.e., a symbol or combination of symbols associated with an award), the player receives that award when the generated symbol or combination of symbols appears along an active payline associated with the reels or in a scatter pay. An outcome which corresponds to a payout or reward is referred to herein as a winning outcome. The symbols along a given payline at the end of a spin (i.e., once the reels are stopped and the symbols in the symbol positions are positioned such that a player may determine whether he/she qualifies for an award as a result of the spin) are referred to, with respect to the given payline, as the "outcome of the payline" herein. Thus, an outcome of a spin may comprise one or more outcomes of paylines. If the outcome of the payline corresponds to a payout or other reward, it is a winning outcome. A payline may be in the form of a line that crosses through one symbol on each reel, along which a winning combination may be evaluated. Paylines may be of various shapes (horizontal, vertical, oblique, triangular, trapezoidal, zigzag, etc.)

Applicants have recognized that there is a continuing need for new ways of making reeled slot machine games more exciting, to maintain player interest in such games and to provide additional reward opportunities within the games. Applicants have further recognized that other non-reel types of games (e.g., social network games which allow for player interaction, role playing, advancing through levels, missions or tasks, etc.) would also benefit from the embodiments described herein.

In accordance with at least some embodiments, a game (e.g., a reel-type game, a social network game, etc.) includes a features via which, over one or more sessions, a player is provided an opportunity to collect portions, aspects, layers or components (collectively "components" herein) of a song, melody or musical composition (collectively "composition" herein). For example, during play of a primary game a player may collect instruments utilized to create the composition or collect chords, notes, tracks or other portion or components of the composition, the goal being to achieve the completed composition or a specified portion (e.g., a line or section) of the composition. In accordance with one embodiment, a player may be rewarded for achieving the completed composition (e.g., by entry into a bonus round, a monetary prize, virtual currency, an advancement in the primary game, having his/her name placed on a leader board, a copy of the completed composition, etc.). In some embodiments the player may be attempting to collect or otherwise earn components to a known composition (e.g., a published song of an artist which the player may select as his/her goal). In other embodiments the player may be attempting to create or generate a new composition by putting together the components (e.g., instruments, tracks, chords, etc.) in a new way. In some embodiments, other players (e.g., in a social network game) may contribute to the completion of the composition (e.g., by voting on it, suggesting how it should be put together, etc.).

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. Other terms are defined throughout the present description.

A "game", as the term is used herein (unless specified otherwise), may generally comprise any game (e.g., wagering or non-wagering, electronically playable over a network) playable by one or more players in accordance with specified rules. A game may be playable on a Personal Computer (PC) online in web browsers, on a game console and/or on a mobile device such as a smart-phone or tablet computer. "Gaming" thus generally refers to play of a game.

A "slot-style game", as the term is utilized herein (unless otherwise specified), generally refers to a game comprising one or more physical and/or virtual (e.g., simulated) slot reels and/or positions. While physical and/or simulated reels may "spin" or cycle through a plurality of possible outcomes before landing or stopping on specific symbols representing an outcome of an instance of the game, other electronic slot-style games may comprise a matrix of outcome positions that are filled or populated with symbols representing an outcome of the instance of the game (e.g., typically referred to as "cascading" or "tumbling reel" slots). Slot reel outcomes may be populated randomly or pseudo-randomly or may be pre-determined (and/or determined based on a predetermined and/or desired result) and made to appear random. Slot-style games are typically games of chance and may comprise "casual games", "social network games", and/or "wagering games".

A "casual game", as the term is utilized herein (unless otherwise specified), may generally comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game", as used herein (unless specified otherwise), generally refers to (and in specific embodiments may be expressly limited to) a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but may also be implemented on other platforms such as mobile devices.

A "wagering game", as the term is used herein (unless specified otherwise), may generally comprise (and in specific embodiments may be expressly limited to) a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" generally refers to play of a wagering game.

The term "game provider", as used herein (unless specified otherwise), generally refers to (and in specific embodiments may be expressly limited to) an entity or system of components which provides games for play and facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate a gambling website over which wagers are accepted and results of wagering games are provided.

As utilized herein, the term "player" may generally refer to (and in specific embodiments may be expressly limited to) any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

As used herein, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A "session", as the term is used herein (unless indicated otherwise), may generally comprise (and in specific embodiments may be expressly limited to) a period of time spanning a plurality of event instances or turns of the game, the session having a defined start and defined end. An event instance or turn is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance).

As used herein, the terms "outcome" and "result" should be differentiated in the present description in that an "outcome" is generally a representation of a "result", typically comprising one or more game elements or game symbols. For example, in a "fruit themed" game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein may encompass awards, prizes and/or payouts that are monetary, non-monetary, tangible and/or intangible.

"Bonus round", "bonus mode" or "bonus feature" of a game, as the terms are used interchangeably herein unless indicated otherwise, may refer to a secondary game, entry into which is triggered via one or more events which may occur in a base or primary game. Typically, a player may be able to qualify to play a bonus game based on one or more outcomes in a primary game, such as in a basic mode or a qualifying mode. A bonus round may be played in accordance with a set of rules that is different from those of a primary game, and may be accompanied by displays, colors, sounds, animated sequences, game play and/or prizes that are not part of the primary game. In one embodiment, a primary or base game application or program may include programming or instructions which will automatically begin a bonus round after the player has achieved a triggering event or qualifying condition in the base or primary game.

As used herein, the term "virtual currency" may generally refer to an in-game currency that may be used as part of a game or one or more games provided by a game provider as (i) currency for making wagers, and/or (ii) to purchase or access various in-game items, features or powers.

A "credit balance", as the term is used herein (unless indicated otherwise), may generally refer to (i) a balance of currency, whether virtual currency and/or real currency, usable for making wagers in a game and/or (ii) another tracking mechanism for tracking a player's success or advancement in a game by deducting therefrom points or value for unsuccessful attempts at advancement and adding thereto points or value for successful attempts at advancement.

Some embodiments may be descriptive of an "array" or "matrix" of symbols or game outcomes. As utilized herein, the terms "array" and "matrix" generally refer to a group of symbols, numbers, and/or expressions arranged in a plurality of rows and columns (or that can be readily and appropriately represented mathematically as being so arranged). In some embodiments, the term "array" is utilized to refer to a multi-dimensional matrix or combination of matrices while the term "matrix" is utilized to refer to a two-dimensional set of symbols or numbers (e.g., slot reel symbols and/or mathematical representations thereof). According to some embodiments, such as in the case that an array and/or matrix is populated with graphical game symbols, the array or matrix may be output and/or displayed (e.g., transmit to and/or rendered on a player device) as part of a game session.

I. Systems

Turning first to FIG. 1, a block diagram of a system 100 according to some embodiments is shown. In some embodiments, the system 100 may comprise a gaming platform such as a gaming platform via which one or more multiplayer and/or online games may be played (e.g., one or more slot-style games as described herein). In some embodiments, the system 100 may comprise a plurality of player devices 102*a-n* in communication with and/or via a network 104. In some embodiments, a game server 110 may be in communication with the network 104 and/or one or more of the player devices 102*a-n*. In some embodiments, the game server 110 (and/or the player devices 102*a-n*) may be in communication with a database 140. The database 140 may store, for example, game data (e.g., processed and/or defined by the game server 110), data associated with players (not explicitly shown) owning and/or operating the player devices 102*a-n*, and/or instructions that cause various devices (e.g., the game server 110 and/or the player devices 102*a-n*) to operate in accordance with embodiments described herein.

According to some embodiments, any or all of the components 102*a-n*, 104, 110, 140 of the system 100 may be similar in configuration and/or functionality to any similarly named and/or numbered components described herein. Fewer or more components 102*a-n*, 104, 110, 140 (and/or portions thereof) and/or various configurations of the components 102*a-n*, 104, 110, 140 may be included in the system 100 without deviating from the scope of embodiments described herein. While multiple instances of some components 102*a-n* are depicted and while single instances of other components 104, 110, 140 are depicted, for example, any component 102*a-n*, 104, 110, 140 depicted in the system 100 may comprise a single device, a combination of devices and/or components 102*a-n*, 104, 110, 140, and/or a plurality of devices, as is or becomes desirable and/or practicable. Similarly, in some embodiments, one or more of the various components 102*a-n*, 104, 110, 140 may not be needed and/or desired in the system 100.

The player devices 102*a-n*, in some embodiments, may comprise any type or configuration of electronic, mobile electronic, and or other network and/or communication devices (or combinations thereof) that are or become known or practicable. A first player device 102*a* may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the player devices 102*a-n* may be specifically utilized and/or configured (e.g., via specially-programmed and/or stored instructions such as may define or comprise a software application) to communicate with the game server 110 (e.g., via the network 104).

For purposes of brevity, any or all of the player devices 102*a*-102*n* may be referred to as a player device 102 herein, even though the plurality of player devices 102*a*-102*n* may include different types of player devices (as described below).

In accordance with some embodiments a player device 102 may comprise a computing device that is operable to execute or facilitate the execution of a game program and used or useful by an online player for accessing an online casino or other electronic (e.g., online) game provider. For example, a player device 102 may comprise a desktop computer, computer workstation, laptop, mobile device, tablet computer, Personal Digital Assistant (PDA) devices, cellular or other wireless telephones (e.g., the Apple™ iPhone™), video game consoles (e.g., Microsoft™ Xbox 360™, Sony™ PlayStation™, and/or Nintendo™ Wii™), and/or handheld or portable video game devices (e.g., Nintendo™ Game Boy™ or Nintendo™ DS™). A player device 102 may comprise and/or interface with various components such as input and output devices (each of which is described in detail elsewhere herein) and, in some embodiments, game server 110. A player device 102 may be a dedicated gaming device (e.g., a slot machine) or a non-dedicated gaming device (e.g., an iPad™). It should be noted that a game server 110 may be in communication with a variety of different types of player devices 102.

A player device 102 may be used to play a wagering or non-wagering game (e.g., a social or casual game) over a network and output information relating to the game to players participating in the game (e.g., outcomes for an event instance of the game, qualifying for an award as a result of a qualifying condition being achieved by the player or another player, credit balance of credits available for play of the game, a session result for a session of the game, etc.). Any and all information relevant to any of the aforementioned functions may be stored locally on one or more of the player devices 102 and/or may be accessed using one or more of the player devices 102 (in one embodiments such information being stored on, or provided via, the game server 110). In another embodiment, a player device 102 may store some or all of the program instructions for determining, for example, (i) that an event instance has been triggered or initiated (and, in some embodiments, communicating such a trigger or initiation to game server 110), (ii) that a qualifying event has been achieved by the player (e.g., based on a result of the game instance); (iii) identifying at least one other player to whom a bonus should be awarded (the bonus being funded out of the respective other player's bonus funding account) as a result of the player achieving a qualifying event, and/or (iv) determining a bonus (e.g., a value or range of a bonus) or game model to utilize for a player (e.g., based on the balance of the bonus funding account, game play activity of the player to whom the bonus or game model is to be output and/or game play activity of the player who achieved the qualifying event). In some embodiments, the game server 110 may be operable to authorize the one or more player devices 102 to access such information and/or program instructions remotely via the network 104 and/or download from the game server 110 (e.g., directly or via an intermediary server such as a web server) some or all of the program code for executing one or more of the various functions described in this disclosure. In other embodiments, outcome and result determinations may be carried out by the game server 110 (or another server with which the game server 110 communicates) and the player devices 102 may be terminals for displaying to an associated player such outcomes and results and other graphics and data related to a game.

It should be noted that the one or more player devices 102 may each be located at the same location as at least one other player device 102 (e.g., such as in a casino or internet café) or remote from all other player devices 102. Similarly, any given player device may be located at the same location as the game server 110 or may be remote from the game server 110. It should further be noted that while the game server 110 may be useful or used by any of the player devices 102 to perform certain functions described herein, the game server 110 need not control any of the player devices 102. For example, in one embodiment the game server 110 may comprise a server hosting a website of an online casino accessed by one or more of the player devices 102.

The network 104 may, according to some embodiments, comprise a LAN, WAN, cellular telephone network, Bluetooth® network, NFC network, and/or RF network with communication links between the player devices 102*a-n*, the game server 110, and/or the database 140. In some embodiments, the network 104 may comprise direct communications links between any or all of the components 102*a-n*, 110, 140 of the system 100. The game server 110 may, for example, be directly interfaced or connected to the database 140 via one or more wires, cables, wireless links, and/or other network components, such network components (e.g., communication links) comprising portions of the network 104. In some embodiments, the network 104 may comprise one or many other links or network components other than those depicted in FIG. 1. A second player device 102*b* may, for example, be connected to the game server 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 110, 140 of the system 100. The network 104 may comprise one or more cellular telephone networks with communication links between the player devices 102a-n and the game server 110, for example, and/or may comprise the Internet, with communication links between the player devices 102a-n and the database 140, for example.

According to some embodiments, the game server 110 may comprise a device (and/or system) owned and/or operated by or on behalf of or for the benefit of a gaming entity (not explicitly shown). The gaming entity may utilize player and/or game information or instructions (e.g., stored by the database 140), in some embodiments, to host, manage, analyze, design, define, price, conduct, and/or otherwise provide (or cause to be provided) one or more games such as online multiplayer games (e.g., one or more slot-style games as described herein). In some embodiments, the gaming entity (and/or a third-party; not explicitly shown) may provide an interface (not shown in FIG. 1) to and/or via the player devices 102a-n. The interface may be configured, according to some embodiments, to allow and/or facilitate electronic game play by one or more players. In some embodiments, the system 100 (and/or interface provided by the game server 110) may present game data (e.g., from the database 140) in such a manner that allows players to participate in one or more online games (singularly, in/with groups, and/or otherwise). According to some embodiments, the game server 110 may cause and/or facilitate various functionality and/or features of one or more slot-style games, each as described herein.

In some embodiments, the database 140 may comprise any type, configuration, and/or quantity of data storage devices that are or become known or practicable. The database 140 may, for example, comprise an array of optical and/or solid-state hard drives configured to store player and/or game data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the player devices 102a-n may comprise the database 140 or a portion thereof, for example, and/or the game server 110 may comprise the database 140 or a portion thereof.

According to some embodiments, any or all of the player devices 102a-n in conjunction with one or more of the game server 110 and/or the database 140 (e.g., via the network 104) may conduct (in whole or in part), facilitate, and/or otherwise be associated with execution of one or more stored procedures, applications, processes, and/or methods (e.g., the methods described herein, and/or one or more portions and/or combinations thereof) as described herein.

It should be noted that in some embodiments database 140 may be stored on a game server 110 while in other embodiments database 140 may be stored on another computing device with which game server 110 is operable to communicate in order to at least access the data in database 140 (e.g., another server device remote from game server 140, operable to determine a game model to utilize and/or whether a friend of a player qualifies to have a bonus awarded from the player's bonus funding account based on a qualifying event achieved by the player). In some embodiments a processor (e.g., one or more microprocessors, one or more microcontrollers, one or more digital signal processors) of a player device 102 and/or game server 110 may receive instructions (e.g., from a memory or like device), and execute those instructions, thereby performing one or more processes defined by those instructions. Instructions may be embodied in, e.g., one or more computer programs and/or one or more scripts.

In some embodiments a game server 110 and/or one or more of the player devices 102 stores and/or has access to data useful for facilitating play of a game. For example, game server 110 and/or a player device 102 may store (i) one or more probability databases for determining one or more outcome(s) for an event instance or turn of a game, (ii) a current state or status of a game or game session, (iii) one or more user interfaces for use in a game, (iv) one or more game models for a game, (v) whether a player has achieved a qualifying event for awarding a bonus to a friend of a player, (vi) whether the friend of the player has a sufficient balance in his/her bonus funding account to be awarded a bonus based on the qualifying event, and/or (v) profiles or other personal information associated with a player of a game (e.g., friends associated with the player who may qualify for a bonus based on the player achieving a qualifying event during game play). It should be noted that in some embodiments such data may be stored on the game server 110 and information based on such data may be output to a player device 102 during play of a game while in other embodiments a game program may be downloaded to a local memory of a player device 102 and thus such data may be stored on a player device 102 (e.g., in encrypted or other secure or tamper-resistant form).

A game server 110 may comprise a computing device for facilitating play of a game (e.g., by receiving an input from a player, determining an outcome for a game, causing an outcome of a game to be displayed on a player device, facilitating a wager and/or a provision of a payout for a game). For example, the game server 110 may comprise a server computer operated by a game provider or another entity (e.g., a social network website not primarily directed at providing games). In some embodiments, the game server may determine an outcome for a first aspect and/or second aspect of a game by requesting and receiving such an outcome from another remote server operable to provide such outcomes. In some embodiments, the game server 110 may further be operable to facilitate a game program for a game (e.g., a wagering game). In accordance with some embodiments, in addition to administering or facilitating play of a game, a game server 110 may comprise one or more computing devices responsible for handling online processes such as, but not limited to: serving a website comprising one or more games to a player device and/or processing transactions (e.g., wagers, deposits into financial accounts, updating a balance of a bonus funding account based on game play of a player, managing accounts, controlling games, etc.). In some embodiments, game server 110 may comprise two or more server computers operated by the same entity (e.g., one server being primarily for storing states of games in progress and another server being primarily for storing mechanisms for determining outcomes of games, such as a random number generator). Examples of processes that may be performed by the game server 110 (directly or indirectly) may include, but are not limited to: (i) determining whether a player has achieved a qualifying event during play of a game; (ii) determining one or more friends in the player's network who may qualify to receive a bonus funded out of their respective bonus funding accounts based on the player achieving the qualifying event; (iii) updating the player's bonus funding account based on game play of the player and/or bonuses awarded to the player out of the bonus funding account; (iv) storing an indication of a bonus due to a player as a result of another player achieving a qualifying event; (v) determining a game model to utilize for a game based on a balance of a bonus funding account of a player and/or a bonus awarded to the player as a result of a qualifying event achieved by another player; (vi) authorizing a game program to be downloaded to a player device; and/or (vii) outputting (or directing another device to output, or queuing for output) a notification to a player that the player has been awarded a bonus (e.g., funded out of a bonus funding account, the existence or funding source of which the player may be unaware in accordance with some embodiments) as a result of another player achieving a qualifying event.

In one embodiment, a game server 110 may not be necessary or desirable. For example, some embodiments described in this disclosure may be practiced on one or more player devices 102 without a central authority. In such an embodiment, any functions described herein as performed by a game server 110 and/or data described as stored on a game server 110 may instead be performed by or stored on one or more player devices 102. Additional ways of distributing information and program instructions among one or more player devices 102, a game server 110 and/or another server device will be readily understood by one skilled in the art upon contemplation of the present disclosure.

Figure 2:
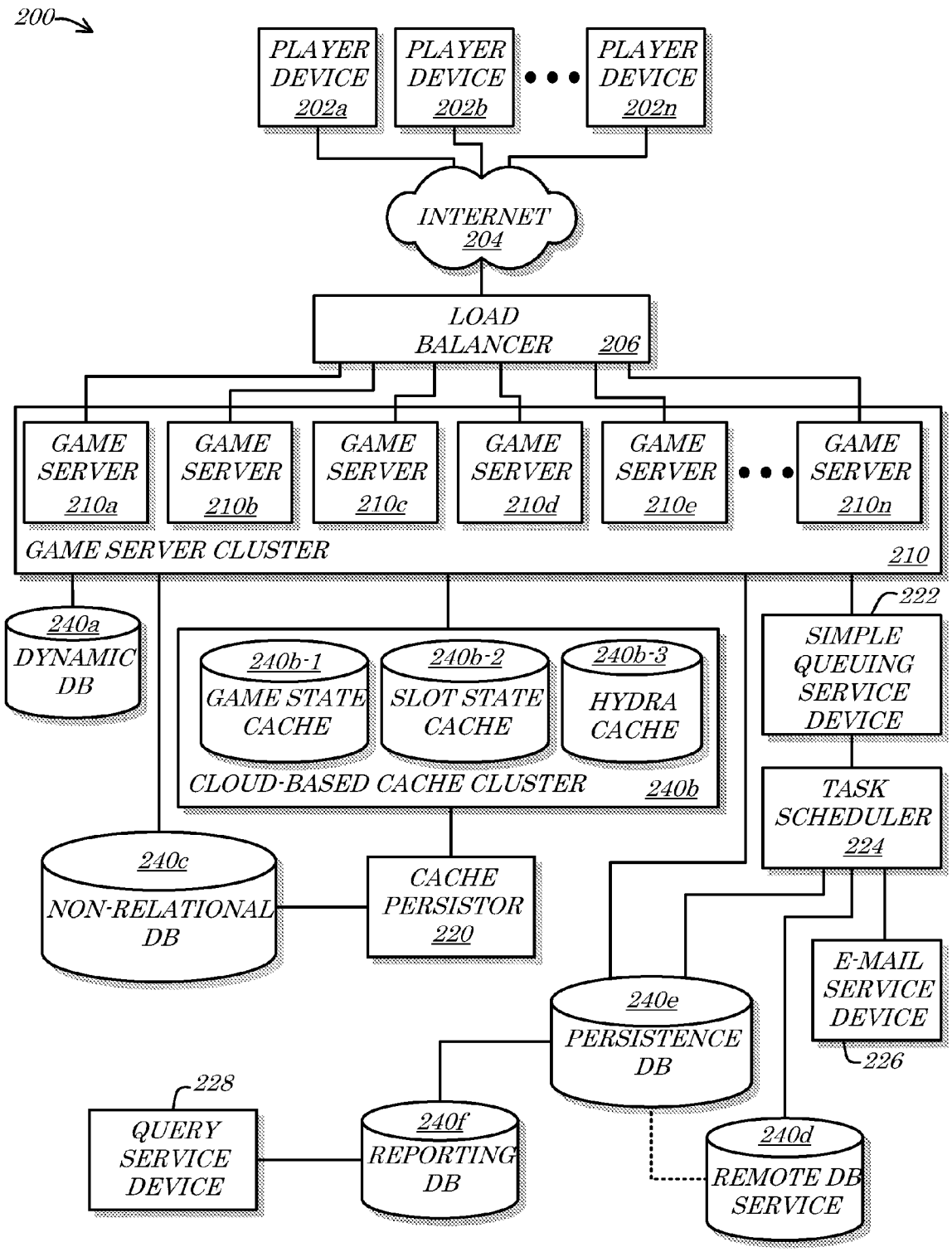
FIG. 2 is a block diagram of a system according to some embodiments.

Referring now to FIG. 2, a block diagram of a system 200 according to some embodiments is shown. In some embodiments, the system 200 may comprise a gaming platform such as a platform via which social, multiplayer, and/or online games may be played (e.g., one or more slot-style games as described herein). In some embodiments, the system 200 may comprise a plurality of player devices 202a-n, the Internet 204, a load balancer 206, and/or a game server cluster 210. The game server cluster 210 may, in some embodiments, comprise a plurality of game servers 210a-n. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202a-n, 204, 206, 210a-n, 220, 222, 224, 226, 228 may be in communication with and/or coupled to one or more databases 240a-f. The system 200 may comprise, for example, a dynamic database (DB) 240a, a cloud-based cache cluster 240b (e.g., comprising a game state cache 240b-1, a slot state cache 240b-2, and/or a "hydra" cache 240b-3), a non-relational DB 240c, a remote DB service 240d, a persistence DB 240e, and/or a reporting DB 240f.

According to some embodiments, any or all of the components 202a-n, 204, 206, 210a-n, 220, 222, 224, 226, 228, 240a-f of the system 200 may be similar in configuration and/or functionality to any similarly named and/or numbered components described herein. Fewer or more components 202a-n, 204, 206, 210a-n, 220, 222, 224, 226, 228, 240a-f (and/or portions thereof) and/or various configurations of the components 202a-n, 204, 206, 210a-n, 220, 222, 224, 226, 228, 240a-f may be included in the system 200 without deviating from the scope of embodiments described herein. While multiple instances of some components 202a-n, 210a-n, 240a-f are depicted and while single instances of other components 204, 206, 220, 222, 224, 226, 228 are depicted, for example, any component 202a-n, 204, 206, 210a-n, 220, 222, 224, 226, 228, 240a-f depicted in the system 200 may comprise a single device, a combination of devices and/or components 202a-n, 204, 206, 210a-n, 220, 222, 224, 226, 228, 240a-f, and/or a plurality of devices, as is or becomes desirable and/or practicable. Similarly, in some one or more of the various components 202a-n, 204, 206, 210a-n, 220, 222, 224, 226, 228, 240a-f may not be needed and/or desired in the system 200.

According to some embodiments, the player devices 202a-n may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slot-style games, poker, and/or other games of chance, skill, and/or combinations thereof. In some embodiments, the various game servers 210a-n (virtual and/or physical) of the game server cluster 210 may be configured to provide, manage, host, and/or conduct individual instances and/or sessions of available game types. A first game server 210a, for example, may host a session of an online bingo game (or tournament), a second game server 210c may host a second particular session of an online bingo game (or tournament), a third game server 210c may facilitate an online poker tournament (e.g., and a corresponding plurality of game sessions that comprise the tournament), and/or a fourth game server 210d may provide an online slots game (e.g., by hosting one or more slot game sessions).

In some embodiments, the player devices 202a-n may comprise various components (hardware, firmware, and/or software; not explicitly shown) that facilitate game play and/or interaction with the game server cluster 210. The player device 202a-n may, for example, comprise a gaming client such as a software application programmed in Adobe® Flash® and/or HTML 5 that is configured to send requests to, and receive responses from, one or more of the game servers 210a-n of the game server cluster 210. In some embodiments, such an application operating on and/or via the player devices 202a-n may be configured in Model-View-Controller (MVC) architecture with a communication manager layer responsible for managing the requests to/responses from the game server cluster 210. In some embodiments, one or more of the game servers 210a-n may also or alternatively be configured in a MVC architecture with a communication manager and/or communications management layer (not explicitly shown in FIG. 2). In some embodiments, communications between the player devices 202a-n and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202a-n and the game server cluster 210 may be managed and/or facilitated by the load balancer 206. The load balancer 206 may, for example, route communications from player devices 202a-n to one or more of the specific game servers 210a-n depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/"stickiness"). In some embodiments, the load balancer 206 may comprise one or more devices and/or services provided by a third-party (not separately shown in FIG. 2). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210a-n within the game server cluster 210. In the case that traffic and/or requests from the player devices 202a-n only require the first and second game servers 210a-b, for example, all other game servers 210c-n may be taken off-line, may not be initiated and/or called, and/or may otherwise not be required and/or utilized in the system 200. As demand increases (and/or if performance, security, and/or other issues cause one or more of the first and second game servers 210a-b to experience detrimental issues), the load balancer 206 may call and/or bring online one or more of the other game servers 210c-n depicted in FIG. 2. In the case that each game server 210a-n comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202a-n and the game server cluster 210 are conducted and/or routed. Such proxy servers and/or devices may comprise one or more regional game hosting centers, for example, which may be geographically dispersed and addressable by player devices 202a-n in a given geographic proximity. In some embodiments, the proxy servers and/or devices may be located in one or more geographic areas and/or jurisdictions while the game server cluster 210 (and/or certain game servers 210a-n and/or groups of game servers 210a-n thereof) is located in a separate and/or remote geographic area and/or jurisdiction.

According to some embodiments, for at least one specific game type, such as a game that allows for a player thereof to accumulate components of a composition during one or more sessions of the game as described herein, the game server cluster 210 may provide game outcomes (such as outcomes resulting in the player winning or otherwise achieving an additional component to a composition the player is progressing in) to a controller device (not separately shown in FIG. 2) that times the release of game outcome information to the player devices 202a-n such as by utilizing a broadcaster device (also not separately shown in FIG. 2) that transmits the time-released game outcomes to the player devices 202a-n (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210a-n thereof) may be in communication with the dynamic DB 240a. According to some embodiments, the dynamic DB 240a may comprise a dynamically-scalable database service such as the DyanmoDB™ service provided by Amazon® Web Services, LLC. The dynamic DB 240a may, for example, store information specific to one or more certain game types (e.g., a reeled slots themed game which provides for accumulation, achievement or obtainment by a player of a plurality of components of a composition which, when put together, result in a completed composition) provided by the game server cluster 210 such as to allow, permit, and/or facilitate reporting and/or analysis of such information (e.g., reporting of a player's progress in a composition, the popularity among other players of compositions created by a particular player based on musical components obtained by the player during play of the game over one or more sessions, etc.).

According to some embodiments, the game server cluster 210 (and/or one or more of the game servers 210a-n thereof) may be in communication with the cloud-based cache cluster 240b. Game state information from the game server cluster 210 may be stored in the game state cache 240b-1, for example, slot state (e.g., slot-game specific state) data may be stored in the slot state cache 240b-2, and/or other game and/or player information (e.g., progressive data, referral data, player rankings, audit data) may be stored in the hydra cache 240b-3. In some embodiments, the cache persistor 220 may move and/or copy data stored in the cloud-based cache cluster 240b to the non-relational DB 240c. The non-relational DB 240c may, for example, comprise a SimpleDB™ service provided by Amazon® Wed Services, LLC. According to some embodiments, the game server cluster 210 may generally access the cloud-based cache cluster 240b as-needed to store and/or retrieve game-related information. The data stored in the cloud-based cache cluster 240b may generally comprise a subset of the newest or freshest data, while the cache persistor 220 may archive and/or store or move such data to the non-relational DB 240c as it ages and/or becomes less relevant (e.g., once a player logs-off, once a game session and/or tournament ends). The game server cluster 210 may, in accordance with some embodiments, have access to the non-relational DB 240c as-needed and/or desired. The game servers 210a-n may, for example, be initialized with data from the non-relational DB 240c and/or may store and/or retrieve low frequency and/or low priority data via the non-relational DB 240c.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240d (e.g., providing inserts and/or updates), and/or the persistence DB 240e (e.g., providing and/or updating game, player, and/or other reporting data), e.g., in accordance with one or more schedules.

According to some embodiments, the persistence DB 240e may comprise a data store of live environment game and/or player data. The game server cluster 210 and/or the task scheduler 224 or SQS device 222 may, for example, store game and/or player data to the persistence DB 240e and/or may pull and/or retrieve data from the persistence DB 240e, as-needed and/or desired. The server cluster 210 may, according to some embodiments, provide and/or retrieve spin and/or other game event information and/or configuration information via the persistence DB 240e.

In some embodiments, the reporting DB 240f may be created and/or populated based on the persistence DB 240e. On a scheduled and/or other basis, for example, a data transformation and/or mapping program may be utilized to pull data from the live environment (e.g., the persistence DB 240e) into the reporting DB 240f. The query service 228 may then be utilized, for example, to query the reporting DB 240f, without taxing the live environment and/or production system directly accessible by the game server cluster 210.

According to some embodiments, any or all of the player devices 202a-n in conjunction with one or more of the game servers 210a-n and/or the databases 240a-f (e.g., via the network 204) may conduct (in whole or in part), facilitate, and/or otherwise be associated with execution of one or more stored procedures, applications, processes, and/or methods (e.g., the methods described herein, and/or one or more portions and/or combinations thereof) as described herein.

Figure 3:
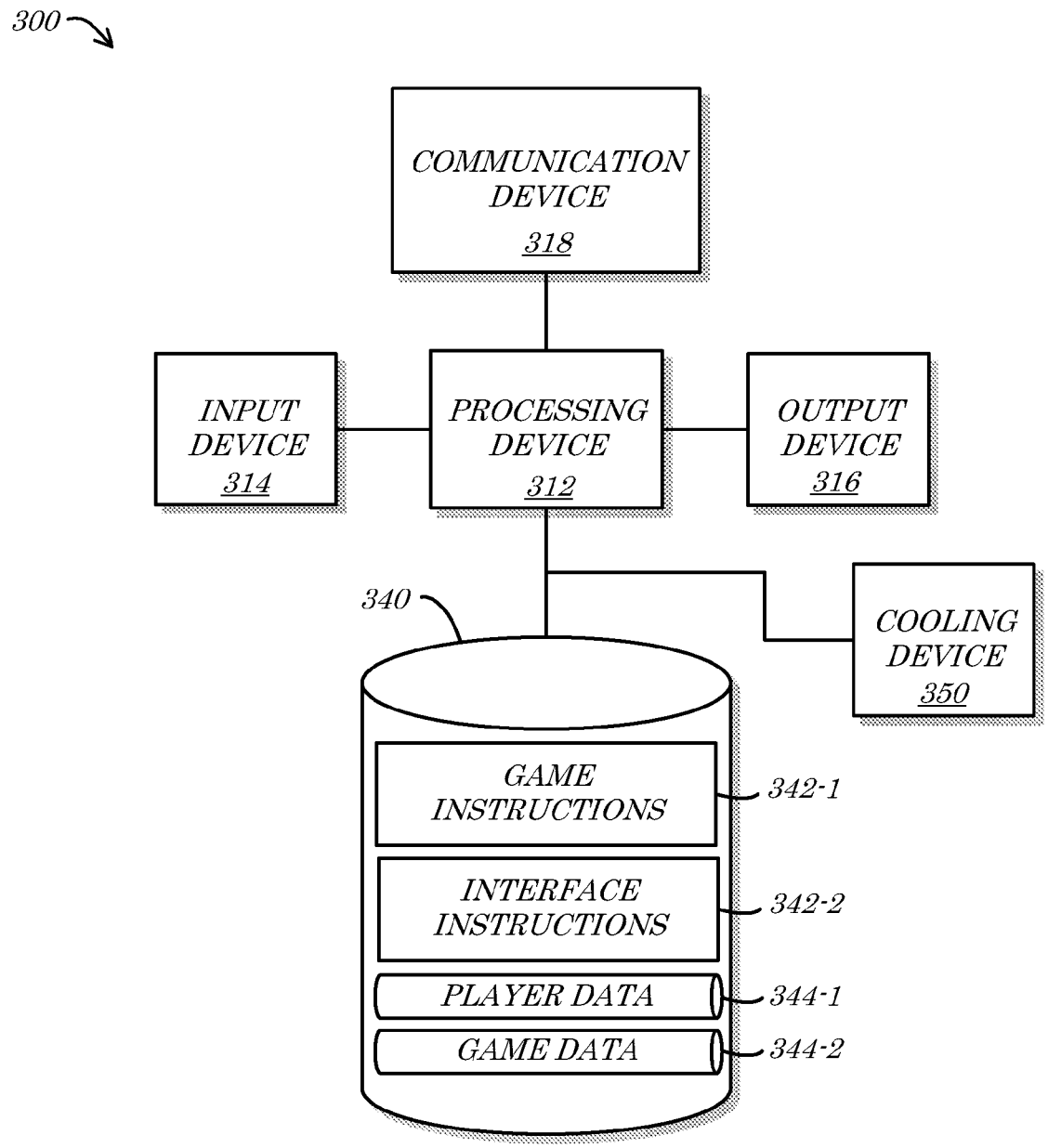
FIG. 3 is a block diagram of an apparatus according to some embodiments.

Turning to FIG. 3, a block diagram of an apparatus 300 according to some embodiments is shown. In some embodiments, the apparatus 300 may be similar in configuration and/or functionality to any of the player and/or user devices 102*a-n*, 202*a-n* and/or the servers and/or controller devices 110, 210*a-n* of FIG. 1, FIG. 2 herein, and/or may otherwise comprise a portion of the systems 100, 200 of FIG. 1, FIG. 2 herein. The apparatus 300 may, for example, execute, process, facilitate, and/or otherwise be associated with the methods described in this disclosure. In some embodiments, the apparatus 300 may comprise a processing device 312, an input device 314, an output device 316, a communication device 318, a memory device 340, and/or a cooling device 350. According to some embodiments, any or all of the components 312, 314, 316, 318, 340, 350 of the apparatus 300 may be similar in configuration and/or functionality to any similarly named and/or numbered components described herein. Fewer or more components 312, 314, 316, 318, 340, 350 and/or various configurations of the components 312, 314, 316, 318, 340, 350 be included in the apparatus 300 without deviating from the scope of embodiments described herein.

According to some embodiments, the processing device 312 may be or include any type, quantity, and/or configuration of electronic and/or computerized processor that is or becomes known. The processing device 312 may comprise, for example, an Intel® IXP 2800 network processor or an Intel® XEON™ Processor coupled with an Intel® E7501 chipset. In some embodiments, the processing device 312 may comprise multiple inter-connected processors, microprocessors, and/or micro-engines. According to some embodiments, the processing device 312 (and/or the apparatus 300 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 300 comprises a server such as a blade server, necessary power may be supplied via a standard AC outlet, power strip, surge protector, a PDU, and/or Uninterruptible Power Supply (UPS) device.

In some embodiments, the input device 314 and/or the output device 316 are communicatively coupled to the processing device 312 (e.g., via wired and/or wireless connections and/or pathways) and they may generally comprise any types or configurations of input and output components and/or devices that are or become known, respectively. The input device 314 may comprise, for example, a keyboard that allows an operator of the apparatus 300 to interface with the apparatus 300 (e.g., by a player, such as to participate in an online game session as described herein). In some embodiments, the input device 314 may comprise a sensor configured to provide information to the apparatus 300 and/or the processing device 312. The output device 316 may, according to some embodiments, comprise a display screen and/or other practicable output component and/or device. The output device 316 may, for example, provide a game interface (not explicitly shown in FIG. 3) to a player (e.g., via a website). According to some embodiments, the input device 314 and/or the output device 316 may comprise and/or be embodied in a single device such as a touch-screen monitor.

In some embodiments, the communication device 318 may comprise any type or configuration of communication device that is or becomes known or practicable. The communication device 318 may, for example, comprise a network interface card (NIC), a telephonic device, a cellular network device, a router, a hub, a modem, and/or a communications port or cable. In some embodiments, the communication device 318 may be coupled to provide data to a player device (not shown in FIG. 3), such as in the case that the apparatus 300 is utilized to provide a game interface to a player as described herein. The communication device 318 may, for example, comprise a cellular telephone network transmission device that sends signals indicative of game interface components to customer and/or subscriber handheld, mobile, and/or telephone device. According to some embodiments, the communication device 318 may also or alternatively be coupled to the processing device 312. In some embodiments, the communication device 318 may comprise an IR, RF, Bluetooth™, and/or Wi-Fi® network device coupled to facilitate communications between the processing device 312 and another device (such as a player device and/or a third-party device).

The memory device 340 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 340 may, according to some embodiments, store one or more of game instructions 342-1 and/or interface instructions 342-2. In some embodiments, the game instructions 342-1 and/or the interface instructions 342-2 may be utilized by the processing device 312 to provide output information via the output device 316 and/or the communication device 318.

According to some embodiments, the game instructions 342-1 may be operable to cause the processing device 312 to process player data 344-1 and/or game data 344-2. Player data 344-1 and/or game data 344-2 received via the input device 314 and/or the communication device 318 may, for example, be analyzed, sorted, filtered, decoded, decompressed, ranked, scored, plotted, and/or otherwise processed by the processing device 312 in accordance with the game instructions 342-1.

In some embodiments, the interface instructions 342-2 may be operable to cause the processing device 312 to process player data 344-1 and/or game data 344-2. Player data 344-1 and/or game data 344-2 received via the input device 314 and/or the communication device 318 may, for example, be analyzed, sorted, filtered, decoded, decompressed, ranked, scored, plotted, and/or otherwise processed by the processing device 312 in accordance with the interface instructions 342-2. In some embodiments, player data 344-1 and/or game data 344-2 may be fed by the processing device 312 through one or more mathematical and/or statistical formulas and/or models in accordance with the interface instructions 342-2 to provide one or more game interfaces in accordance with embodiments described herein.

Any or all of the exemplary instructions and data types described herein and other practicable types of data may be stored in any number, type, and/or configuration of memory devices that is or becomes known. The memory device 340 may, for example, comprise one or more data tables or files, databases, table spaces, registers, and/or other storage structures. In some embodiments, multiple databases and/or storage structures (and/or multiple memory devices 340) may be utilized to store information associated with the apparatus 300. According to some embodiments, the memory device 340 may be incorporated into and/or otherwise coupled to the apparatus 300 (e.g., as shown) or may simply be accessible to the apparatus 300 (e.g., externally located and/or situated).

In some embodiments, the apparatus 300 may comprise a cooling device 350. According to some embodiments, the cooling device 350 may be coupled (physically, thermally, and/or electrically) to the processing device 312 and/or to the memory device 340. The cooling device 350 may, for example, comprise a fan, heat sink, heat pipe, radiator, cold plate, and/or other cooling component or device or combinations thereof, configured to remove heat from portions or components of the apparatus 300.

One or more various types of data storage devices may be utilized to store instructions and/or data such as the game instructions 342-1 and/or interface instructions 342-2, each of which is described in reference to FIG. 3 herein. In some embodiments, instructions stored on the data storage devices may, when executed by a processor (such as the processor device 312 of FIG. 3), cause the implementation of and/or facilitate one or more of various methods, and/or portions or combinations thereof, as described herein.

According to some embodiments, a data storage device may comprise one or more various types of internal and/or external hard drives. The data storage device may, for example, comprise a data storage medium that is read, interrogated, and/or otherwise communicatively coupled to and/or via a disk reading device. In some embodiments, the first data storage device and/or the data storage medium may be configured to store information utilizing one or more magnetic, inductive, and/or optical means (e.g., magnetic, inductive, and/or optical-encoding). A data storage medium, for example, may comprise one or more of a polymer layer, a magnetic data storage layer, a non-magnetic layer, a magnetic base layer, a contact layer, and/or a substrate layer. According to some embodiments, a magnetic read head may be coupled and/or disposed to read data from the magnetic data storage layer.

In some embodiments, a data storage medium may comprise a plurality of data points disposed with the data storage medium. The data points may, in some embodiments, be read and/or otherwise interfaced with via a laser-enabled read head disposed and/or coupled to direct a laser beam through the data storage medium.

In some embodiments, a data storage device may comprise a CD, CD-ROM, DVD, Blu-Ray™ Disc, and/or other type of optically-encoded disk and/or other storage medium that is or becomes known or practicable. In some embodiments, a data storage device may comprise a USB keyfob, dongle, and/or other type of flash memory data storage device that is or becomes know or practicable. In some embodiments, a data storage device may comprise RAM of any type, quantity, and/or configuration that is or becomes practicable and/or desirable. In some embodiments, a data storage device may comprise an off-chip cache such as a Level 2 (L2) cache memory device. According to some embodiments, a data storage device may comprise an on-chip memory device such as a Level 1 (L1) cache memory device.

Any one or more of various types of data storage devices may generally store program instructions, code, and/or modules that, when executed by a processing device, cause a particular machine to function in accordance with one or more embodiments described herein. Some types of data storage devices may be representative of a class and/or subset of computer-readable media that are defined herein as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable herein.

In some embodiments, one or more specialized machines such as a computerized processing device, a server, a remote terminal, and/or a customer device may implement the various practices described herein. A computer system of an gaming entity may, for example, comprise various specialized computers that interact to provide for online games as described herein.

II. Methods

Thus, the systems and devices described in this disclosure may be utilized to provide a game type in which a player of the game is provided an opportunity to win, obtain or achieve components of a composition (e.g., musical components such a instruments, tracks, notes or portions of a musical composition) as outcomes (e.g., bonus outcomes comprising outcomes of bonus layer or aspect of the game which is in addition to outcomes provided during a primary aspect of the game). This musical aspect of the game may provide additional entertainment to the player and provide the game provider an opportunity to provide a non-monetary (in accordance with some embodiments) reward mechanism to players. For example, in a reel-based game, a result of a spin of the reels may be that a component (e.g., an instrument or note) of a composition is unlocked for a player. In some embodiments, if a player achieves a first level of success (e.g., by getting a line of the musical composition completed), the player may qualify for another level or bonus round of the game, in which the player may collect additional components of the same or a different composition.

In one embodiment, a player may select a previously created musical composition (e.g., from a menu of available musical compositions) to works towards completing and at least some outcomes of the game may comprise components of the composition which, when all are obtained by the player, result in the completed musical composition being played for the player. For example, the musical composition as completed to date by the player may play as background music for the player during the game (or when a particular button or link is actuated by the player) and the final composition may play as a reward to the player for completing the composition. In some embodiments, completing the composition by collecting all the available components of the composition may result in a further reward to the player (e.g., entry in to a bonus round, credits being added to a credit meter of the player, virtual currency being added to an account of the player, a free spin or game instance being awarded to the player, a copy of the musical composition being made available for downloading by the player, etc.). In some embodiments, a player may be allowed to collect components which the player may then use to create his own unique composition (or put together in a preferred way to create a new composition or try to reproduce a previously created composition). In such an embodiment, the player may thus be allowed to become a musical composer and be provided an interface via which the player may arrange the components thus far collected by the player during play of the game. In some embodiments, the player may "publish" his musical composition when it is completed by, for example, sharing it on a social networking site associated with the game.

The embodiments described herein may be made available on either a traditional wagering game (e.g., in an online casino or on a slot machine in a brick-and-mortar casino) or on a social network game. Some examples of embodiments which may be made available in any of the aforementioned embodiments follow. A social network game may lend itself more readily to a sharing aspect. For example, a player collecting or unlocking musical components (e.g., instruments, riffs, portions of melodies) may in some embodiments be allowed to not only put these together according to their own preference (and thus perhaps create new musical tracks or compositions) but also make these creations available to others (e.g., friends in the player's social network) and ask these others to rate, comment or vote for them.

In accordance with some embodiments, once a player obtains, collects, achieves or unlocks a component comprising a musical instrument, the sound of the game (e.g., background music, musical sound effects corresponding to one or more functions of a game) may reflect this. In one example, if a player collects three bass guitar game objects, a bass riff may start playing. In another example, if a player achieves three drum game objects, a drum track may start playing. The goal of the player may thus be to obtain or unlock all of the instruments utilized to create a final composition and thus be able to hear and enjoy the completed composition as the player is used to hearing it (e.g., in embodiments in which the composition is a previously created composition).

In some embodiments, a menu of available compositions may be output to the player, from which menu the player may select a composition for which the player will attempt to win components during play of the game. In some embodiments, different compositions may be associated with different rewards or payouts to be provided to the player upon the player completing the composition (i.e., unlocking or collecting all of the available components of the composition).

In some embodiments, however, the player may not be requested to select a composition the player is going to attempt to create via the components achieved by the player. Rather, the player may be allowed to select or put together unlocked components as the player prefers, thus allowing the player to choose or switch which composition the player is creating during a session, by arranging or re-arranging unlocked or collected components or selecting which component of a plurality of available components (e.g., in some embodiments, a result of a game instance may be that the player may select a component from a plurality of components, at the player's discretion).

In one example, there may be a top 40 chart (leaderboard) that shows the player the compositions to aim for to get higher payouts. For instance, "Sweet Child of Mine" by Guns-N-Roses may be indicated as the #1 song with highest corresponding payout. Accordingly, a player is likely to be highly engaged and excited if, when the player unlocks a guitar line, the guitar riff that plays is from that song. In another example, a player may have a "near miss" experience in acquiring the guitar, drums and bass for a desired or selected composition, but then unlocks the vocal for a different song.

In accordance with one embodiment, a process performed by a player device and/or a server may provide for: (i) determining a composition selected by a player as a goal for a game (e.g., over a duration of one or more sessions of the player playing the game); (ii) determining, for a particular game instance of the game, that the player is to be provided with a component of the composition; (iii) selecting the particular component to provide to the player; (iv) outputting an outcome to the player, which outcome indicates to the player that the player has unlocked the component; and (v) outputting an updated version of the composition to the player, which version comprises the particular component and any additional components previously unlocked by the player. In some embodiments, the process may further provide for determining whether the player has unlocked a sufficient portion of the composition to qualify for a reward.

In accordance with one embodiment, a process performed by a player device and/or a server may provide for: (i) determining, for a particular game instance of a game, that a player of the game is to be provided with a component usable in creating a composition; (ii) selecting the particular component to provide to the player; (iii) outputting an outcome to the player, which outcome indicates to the player that the player has unlocked the component; (iv) receiving from the player an instruction of how the component is to be integrated into the composition being created by the player (e.g., which instruction may include an instruction of how the component is to be integrated with any previously unlocked components being used by the player in creating the composition); and (v) outputting an updated version of the composition to the player, which version comprises the particular component and any additional components previously unlocked by the player. In some embodiments, the process may further provide for determining whether the player has unlocked a sufficient portion of the composition to qualify for a reward.

Figure 4:
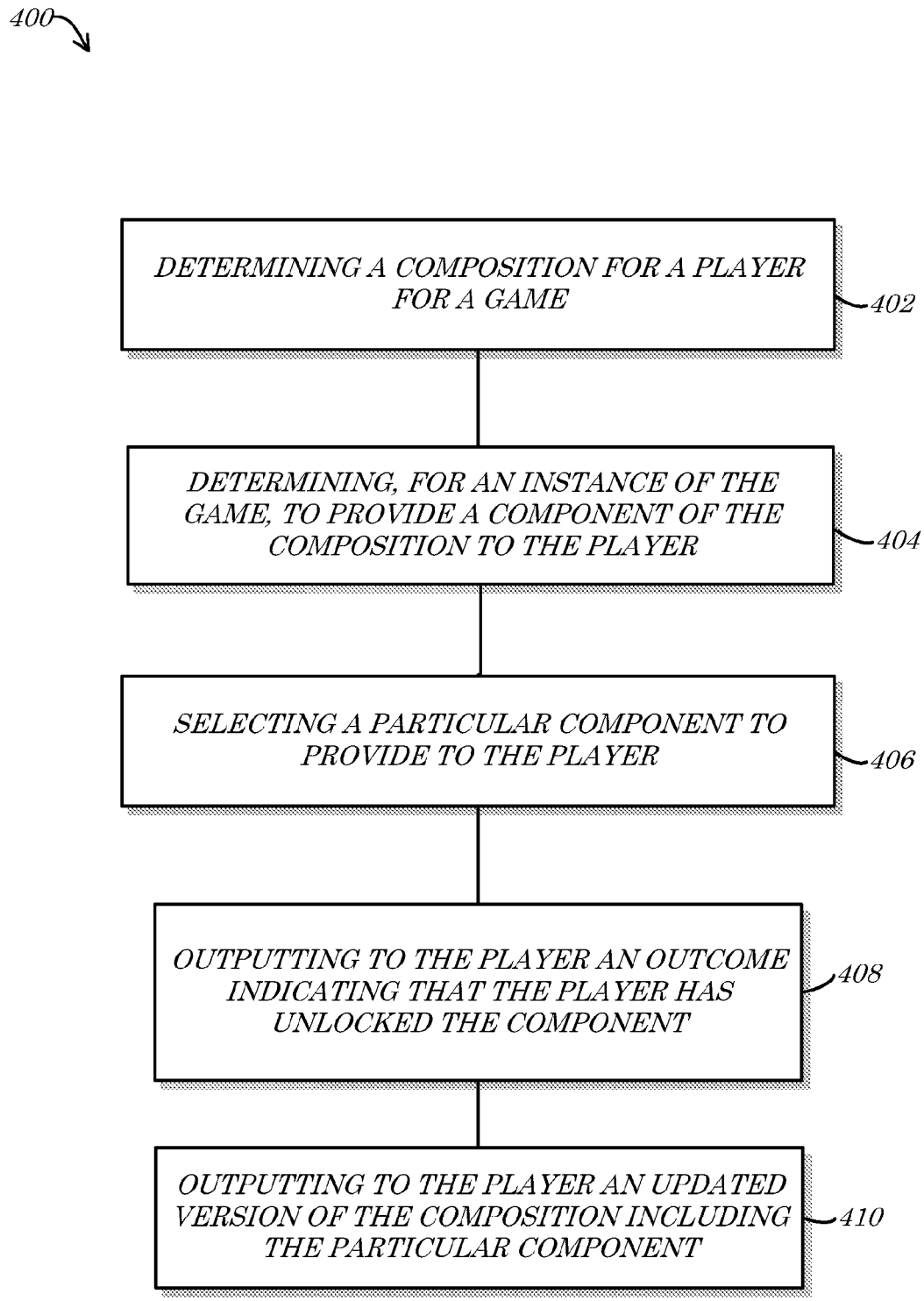
FIG. 4 is a flow diagram of a method according to some embodiments.

Referring now to FIG. 4, a flow diagram of a method 400 according to some embodiments is shown. In some embodiments, the method 400 may be performed and/or implemented by and/or otherwise associated with one or more specialized and/or computerized processing devices (e.g., the player and/or user devices 102a-n, 202a-n and/or the servers and/or controller devices 110, 210a-n, of FIG. 1, FIG. 2 herein), specialized computers, computer terminals, computer servers, computer systems and/or networks, and/or any combinations thereof (e.g., by one or more online game providers and/or online gaming player processing devices). In some embodiments, the method 400 may be embodied in, facilitated by, and/or otherwise associated with various input mechanisms and/or interfaces.

The process and/or flow diagrams described herein do not necessarily imply a fixed order to any depicted actions, steps, and/or procedures, and embodiments may generally be performed in any order that is practicable unless otherwise and specifically noted. Any of the processes and/or methods described herein may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described herein.

In accordance with one embodiment, a process performed by a player device and/or a server may provide for: (i) determining a composition selected by a player as a goal for a game (e.g., over a duration of one or more sessions of the player playing the game); (ii) determining, for a particular game instance of the game, that the player is to be provided with a component of the composition; (iii) selecting the particular component to provide to the player; (iv) outputting an outcome to the player, which outcome indicates to the player that the player has unlocked the component; and (v) outputting an updated version of the composition to the player, which version comprises the particular component and any additional components previously unlocked by the player. In some embodiments, the process may further provide for determining whether the player has unlocked a sufficient portion of the composition to qualify for a reward.

In some embodiments, the method 400 may comprise determining (e.g., by a processing device), a composition for a player for a game (e.g., a goal comprising one or more composition components to achieve over a duration of one or more sessions of the player playing the game), at 402. In one embodiment, a player may select one or more compositions to achieve (e.g., using a game or other type of user interface to make a composition selection).

In some embodiments, the method 400 may comprise determining (e.g., by the processing device) for an instance of the game, to provide a component of the composition to the player, at 404. In one embodiment, the processing device may determine (e.g., based on a result of the game) that the player has qualified to unlock one or more components for the composition. In some embodiments, the method 400 may comprise selecting a particular component to provide to the player, at 406. In one embodiment, selecting the particular component may comprise one or more of: (i) determining a particular type of component (e.g., bass line, chord, guitar part, vocal, drum part, etc.) and/or (ii) selecting a particular component from a plurality of available components (e.g., based on a determined type of component and/or based on a particular outcome determined for a game).

In some embodiments, the method 400 may comprise outputting to the player (e.g., via a game interface) an outcome indicating that the player has unlocked the component, at 408. In one embodiment, if any of the reel symbols determined for a reel spin comprises a winning outcome or winning combination of symbols, the player may be presented with an indication that the player has unlocked the component. In one embodiment, one or more symbols achieved in a game may correspond to the particular component. For example, the player's spin in a reel-type game may show an outcome including a game object corresponding to and/or depicting the particular component.

In some embodiments, the method 400 may comprise outputting to the player (e.g., via a game interface) an updated version of the composition including the particular component, at 410. According to some embodiments, outputting the updated version of the composition may comprise transmitting, playing audio, and/or otherwise outputting a version of the composition including at least the unlocked component. In one embodiment, outputting the updated version may comprise outputting an audio signal representative of one or more unlocked components of the composition. In some embodiments, outputting may comprising outputting audio that includes a version of the composition including all of the components of the composition that the player has unlocked previously or that have otherwise been made available to the player as part of the composition.

In some embodiments, the method 400 may further provide for determining whether the player has unlocked a sufficient portion of the composition to qualify for a reward. In one example, if the player has unlocked a sufficient number of the components of a composition (and/or one or more specific, predetermined components of the composition), the player may be eligible for a reward.

III. Rules of Interpretation

Numerous embodiments are described in this patent application, and are presented for illustrative purposes only. The described embodiments are not, and are not intended to be, limiting. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments. It is contemplated, however, that while some embodiment are not limited by the examples provided herein, some embodiments may be specifically bounded or limited by provided examples, structures, method steps, and/or sequences. Embodiments having scopes limited by provided examples may also specifically exclude features not explicitly described or contemplated.

Neither the Title (set forth at the beginning of the first page of this patent application) nor the Abstract (set forth at the end of this patent application) is to be taken as limiting in any way the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. Similarly, any reference to an "alternate", "alternative", and/or "alternate embodiment" is intended to connote one or more possible variations—not mutual exclusivity. In other words, it is expressly contemplated that "alternatives" described herein may be utilized and/or implemented together, unless they inherently are incapable of being utilized together.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including the specification, its claims and figures, and anything which may be incorporated by reference, unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on". In some embodiments, a first thing being "based on" a second thing refers specifically to the first thing taking into account the second thing in an explicit manner. In such embodiments, for example, a processing step based on the local weather, which itself is in some manner based on or affected by (for example) human activity in the rainforests, is not "based on" such human activities because it is not those activities that being explicitly analyzed, included, taken into account, and/or processed.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "wherein", as utilized herein, does not evidence intended use. The term "wherein" expressly refers to one or more features inclusive in a particular embodiment and does not imply or include an optional or conditional limitation.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to allow for distinguishing that particular referenced feature from another feature that is described by the same term or by a similar term. For example, a "first widget" may be so named merely to allow for distinguishing it in one or more claims from a "second widget", so as to encompass embodiments in which (1) the "first widget" is or is the same as the "second widget" and (2) the "first widget" is different than or is not identical to the "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; (3) does not indicate that either widget ranks above or below any other, as in importance or quality; and (4) does not indicate that the two referenced widgets are not identical or the same widget. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system" or program. A control system or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein. According to some embodiments, a "processor" may primarily comprise and/or be limited to a specific class of processors referred to herein as "processing devices". "Processing devices" are a subset of processors limited to physical devices such as CPU devices, Printed Circuit Board (PCB) devices, transistors, capacitors, logic gates, etc. "Processing devices", for example, explicitly exclude biological, software-only, and/or biological or software-centric physical devices. While processing devices may include some degree of soft logic and/or programming, for example, such devices must include a predominant degree of physical structure in accordance with 35 U.S.C. §101.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i)

may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A method, comprising:
   determining, by a game server in communication with at least one player device, a musical composition for a player of a game;
   determining, by the game server, to provide a first component of the musical composition to the player;
   selecting, by the game server, the first component of the musical composition to provide to the player;
   outputting, by the game server, an outcome indicating that the player has unlocked the first component;
   outputting, by the game server, a first updated version of the musical composition including the first component;
   determining, by the game server, to provide a second component of the musical composition to the player;
   selecting, by the game server, the second component of the musical composition to provide to the player;
   outputting, by the game server, an outcome indicating that the player has unlocked the second component; and
   outputting, by the game server, a second updated version of the musical composition including the first component and the second component.

2. The method of claim 1, wherein determining the musical composition comprises:
   receiving an indication of a selection by a player of the musical composition.

3. The method of claim 1, wherein determining to provide the first component of the musical composition to the player comprises:
   determining that the player is eligible to unlock a component.

4. The method of claim 1, wherein selecting the first component comprises:
   determining an outcome of the game corresponding to the first component.

5. The method of claim 1, wherein the outcome comprises a game object corresponding to the first component.

6. The method of claim 1, wherein outputting the outcome comprises:
   displaying a graphical representation of the outcome via a game interface.

7. The method of claim 1, wherein outputting the second updated version of the musical composition comprises:
   generating an audio signal corresponding to the second updated version of the musical composition, the audio signal comprising an audio representation of the first component and the second component.

8. The method of claim 1, wherein the first updated version of the composition comprises all components previously unlocked for the musical composition.

9. The method of claim 1, further comprising:
   determining whether the player has unlocked a sufficient portion of the musical composition to qualify for a reward.

10. An apparatus comprising:
    a processor; and
    a computer readable memory device storing instructions configured so that when executed by the processor the instructions direct the processor to:
    determine a musical composition for a player of a game;
    determine to provide a first component of the musical composition to the player;
    select the first component of the musical composition to provide to the player;
    output an outcome indicating that the player has unlocked the first component;
    output a first updated version of the composition including the first component;
    determine, by the game server, to provide a second component of the musical composition to the player;
    select, by the game server, the second component of the musical composition to provide to the player;
    output, by the game server, an outcome indicating that the player has unlocked the second component; and
    output, by the game server, a second updated version of the musical composition including the first component and the second component.

11. A method comprising:
    determining, by a game server in communication with at least one player device, to provide a player of a game with a component usable in creating a musical composition;
    selecting, by the game server, a particular component to provide to the player;

outputting, by the game server to the player, an outcome indicating that the player has unlocked the particular component;

receiving, by the game server, an indication of an instruction by the player of how the particular component is to be integrated into a musical composition being created by the player; and outputting, by the game server, an updated version of the musical composition being created by the player, the updated version including the particular component.

12. The method of claim 11, wherein the instruction by the player comprises an indication of how the particular component is to be integrated with any previously unlocked components of the musical composition.

13. The method of claim 11, wherein determining to provide the player of the game with a component usable in creating the musical composition comprises:

determining that the player is eligible to unlock a component.

14. The method of claim 11, wherein selecting the particular component comprises:

determining the outcome, the outcome corresponding to the particular component.

15. The method of claim 11, wherein the outcome comprises a game object corresponding to the particular component.

16. The method of claim 11, wherein outputting the outcome comprises:

displaying a graphical representation of the outcome via a game interface.

17. The method of claim 11, wherein outputting the updated version of the musical composition being created by the player comprises:

generating an audio signal corresponding to the updated version of the musical composition, the audio signal comprising an audio representation of the particular component.

18. The method of claim 11, wherein the updated version of the composition comprises all components previously unlocked for the musical composition.

19. The method of claim 11, wherein the updated version of the composition comprises all components previously integrated into the musical composition.

20. The method of claim 11, wherein outputting the updated version of the musical composition being created by the player comprises:

transmitting the updated version of the musical composition to a social networking website.

* * * * *